Jan. 20, 1931.                L. W. MITCHELL                 1,789,491
                                   NOZZLE
                             Filed Nov. 14, 1927

Inventor
LEO W. MITCHELL.
BY Munn & Co.
Attorneys

Patented Jan. 20, 1931

1,789,491

UNITED STATES PATENT OFFICE

LEO W. MITCHELL, OF SAN FRANCISCO, CALIFORNIA

NOZZLE

Application filed November 14, 1927. Serial No. 233,227.

My invention relates to improvements in nozzles, and it consists in the combinations, constructions, and arrangements hereinafter described and claimed.

An object of my invention is to provide a device of the type described which may be attached to a motor shaft and be supported thereby.

A further object of my invention is to provide a device of the type described which has novel means for causing the air current to flow in a longitudinal direction from the nozzle or to be whirled as it issues from the nozzle.

Other objects and advantages will appear in the following specification, and the novel features of the device will be particularly pointed out in the appended claims.

Figure 1:
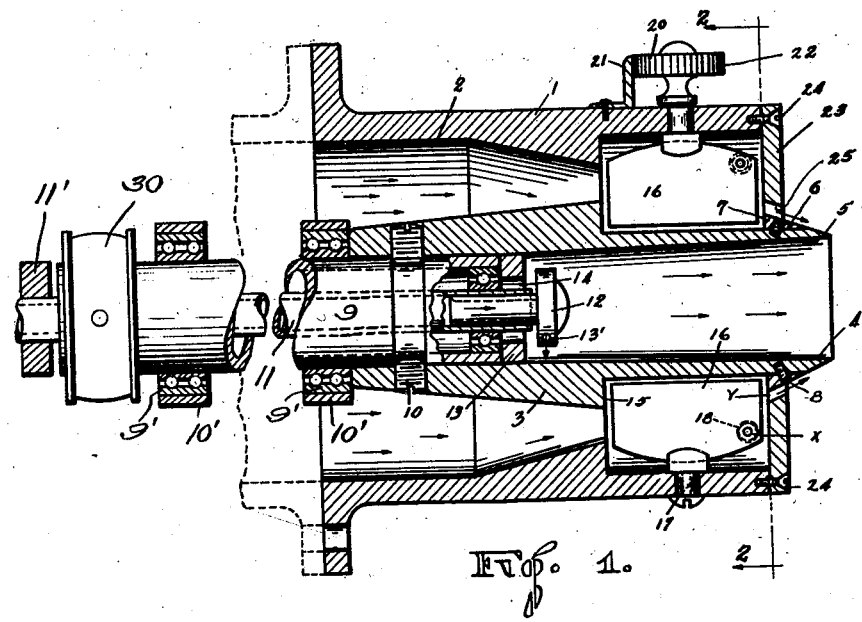
Figure 2:
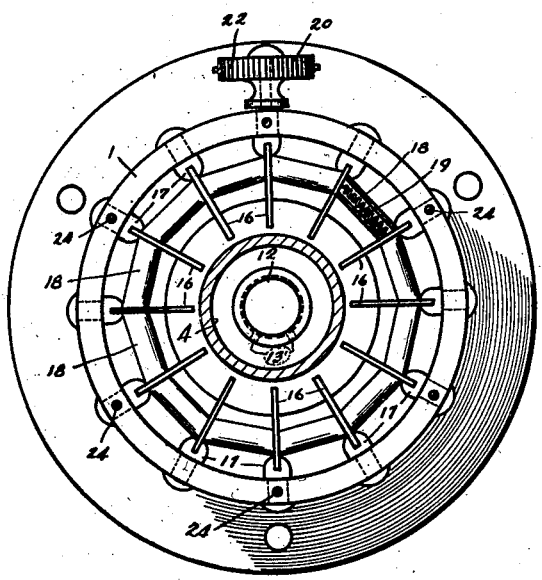

My invention is illustrated in the accompanying drawing forming a part of this application, in which Figure 1 is a longitudinal section through the device, and Figure 2 is a section along the line 2—2 of Figure 1.

In carrying out my invention, I provide a nozzle 1 which is cylindrical in shape, and is provided with an air passageway 2 of the shape shown. Inside of the nozzle 1 I dispose a cup, 3, that has a conical shaped bore, 4, therein for a purpose hereinafter described.

The cup, 3, projects beyond the nozzle 1, and has an inclined outer surface, 5, that merges with the surface, 6, of a ring 7. The ring is secured in place by screws 8 or other suitable fastening means. The cup 3 is mounted upon a hollow shaft 9 and is secured thereto by set screws 10. The shaft 9 may form a part of the motor shaft, the motor not being illustrated in the drawing. However, the shaft may be other than a motor shaft if desired without departing from the spirit and scope of my invention. In Figure 1, I show the shaft 9 as having a pulley 30 disposed thereon which may be driven by any suitable means. In the present illustration I have shown the shaft 9 as being revolvably supported in bearings 9; the latter being mounted in suitable supporting members 10'; it is particularly emphasized that the manner of supporting the shaft 9 depends entirely upon the driving means selected, and that I am not limited to the specific disclosure that I have made. The only requirement is that the shaft 9 be rotated by some mechanism.

Inside of the shaft 9 I mount an oil conveying pipe 11, one end of which is supported by a bracket 11'. This pipe terminates adjacent to the inner end of the bore 4 and carries a head 12 that has two openings 13' therein (see Figure 2) that eject the oil against the inner surface of the bore 4. Figure 1 shows how the pipe 11 is spaced from the shaft 9 and how a ring 13 is disposed at the inner end of the shaft 9, this ring having an opening 14 of greater diameter than the outside diameter of the pipe 11. The parts thus far described show how the cup 3, together with the pipe 9, may be revolved as a unit about the stationary pipe 11 and the head 12.

I provide means for causing air flowing through the passageway 2 to be whirled in a pre-determined direction, this direction being preferably reverse to the whirl given to the fuel as it is ejected from the bore 4. The exterior surface of the cup 3 is provided with an annular recess 15 for receiving the inner ends of air-directing blades or fins 16. The fins are carried by pivots 17 that in turn are rotatively mounted in the casing of the nozzle 1. The fins are also inter-connected by sectional tubing 18 in which springs 19 are housed. The springs and tubing are mounted in one corner of the fins as shown in Figure 1 at X for a purpose now to be described.

One of the fins has its pivot member 17 connected to a turn knob 20, and this knob is held in adjusted position by a spring catch 21 that enters any one of a plurality of notches fashioned in the periphery 22 of the knob. A turning of the knob 20 will cause the fin connected therewith to turn. As heretofore stated, this fin is connected with all of the other fins by the springs and tubing, and therefore a turning of this fin will turn the rest of the fins in like manner. Air passing by the fins will be given a whirling motion when the fins are inclined at an angle with respect to the longitudinal axis of the device. The nozzle 1 has a plate 23 secured by screws 24 or other suitable fastening means. This plate has an opening 25 that is spaced away from the ring 7 a slight distance so as to form with the ring 7 an annular opening the walls of which cause the stream of air issuing therefrom to converge.

From the foregoing description of the various parts of the device, the operation thereof may be readily understood. If the shaft 9 forms a part of a hollow motor shaft, it will be seen that the shaft will be rotated when the motor is started. Oil under pressure will be fed into the pipe 11, and will issue from the openings 13. This oil striking the conical shaped surface of the bore 4 will be whirled around and will move toward the exit because of the conical shape of the bore. The oil will be ejected from the cup 3 in a conical shaped apron like film that will diverge as it goes away from the cup. This divergence of the oil is practically immediately stopped because the film of oil contacts with the air issuing from the opening Y. As heretofore stated, the air flowing through the opening Y converges and will strike the oil and cause it to become thoroughly mixed with the air, thus forming an atomized spray that will readily burn. This mixing of the air and oil is made possible to a greater extent because the oil is whirled in one direction while the air is whirled in the opposite direction.

Although I have shown and described one embodiment of my invention, it is to be understood that the same is susceptible of various changes, and I reserve the right to employ such changes as may come within the scope of the appended claims.

I claim:

1. The combination with an air delivery nozzle, of an oil-whirling member mounted in the nozzle and spaced therefrom to form an annular air discharge opening, means for delivering oil to said member for causing a film of oil to be ejected therefrom and adjustable means disposed in said air delivery nozzle for imparting a swirling movement to air flowing therethrough, said nozzle being fashioned for directing the air into intimate contact with the oil issuing from said oil-whirling member.

2. In an oil burner, an air delivery nozzle, an oil-whirling member mounted in said nozzle and being spaced therefrom to form an annular air discharge opening, adjustable fins disposed in said discharge opening for imparting a swirling movement to air flowing therethrough.

3. In an oil burner, an air delivery nozzle, an oil-whirling member mounted in said nozzle and being spaced therefrom to form an annular air discharge opening, a plurality of fins radially disposed in said discharge opening for imparting a swirling movement to air flowing therethrough, said fins being rotatively mounted, and means interconnecting said fins whereby a movement of one of said fins will act to rotate the other fins.

4. In an oil burner, an air delivery nozzle, an oil-whirling member mounted in said nozzle and being spaced therefrom to form an annular air discharge opening, a plurality of fins radially disposed in said discharge opening for imparting a swirling movement to air flowing therethrough, said fins being rotatively mounted, yielding means interconnecting said fins whereby a movement of one of said fins will act to rotate the other fins, and means disposed exteriorly of said nozzle for rotating said fins.

LEO W. MITCHELL.